(12) United States Patent
Patzold

(10) Patent No.: US 9,545,690 B2
(45) Date of Patent: Jan. 17, 2017

(54) METHOD FOR STRUCTURING AT LEAST ONE SLIDING SURFACE OF A MACHINE ELEMENT

(71) Applicant: Schaeffler Technologies AG & Co. KG, Herzogenaurach (DE)

(72) Inventor: Holger Patzold, Burgebrach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 17 days.

(21) Appl. No.: 14/630,964

(22) Filed: Feb. 25, 2015

(65) Prior Publication Data

US 2015/0321285 A1 Nov. 12, 2015

(30) Foreign Application Priority Data

May 6, 2014 (DE) .......................... 10 2014 208 419

(51) Int. Cl.
*B23K 26/00* (2014.01)
*F01L 1/16* (2006.01)
*B23K 26/06* (2014.01)
*F16C 33/12* (2006.01)

(52) U.S. Cl.
CPC ....... *B23K 26/0084* (2013.01); *B23K 26/0608* (2013.01); *F01L 1/16* (2013.01); *F16C 33/12* (2013.01); *Y10T 74/2107* (2015.01)

(58) Field of Classification Search
CPC ............. B23K 26/0084; B23K 26/0608; F16C 33/1065; F16C 33/107; F16C 3/14; F16C 33/12; Y10T 74/2107
See application file for complete search history.

(56) References Cited

U.S. PATENT DOCUMENTS

| 5,630,953 | A | * | 5/1997 | Klink | ................. | B23K 26/0084 |
| | | | | | | 219/121.69 |
| 6,739,238 | B2 | * | 5/2004 | Ushijima | .................. | F02F 1/20 |
| | | | | | | 92/158 |
| 7,185,620 | B2 | | 3/2007 | Hofmann | | |

FOREIGN PATENT DOCUMENTS

DE 10249761 5/2004

\* cited by examiner

*Primary Examiner* — Thomas Diaz
(74) *Attorney, Agent, or Firm* — Volpe and Koenig, P.C.

(57) ABSTRACT

A method for structuring at least one sliding surface (4) of a machine element (1), wherein the at least one sliding surface (4) is provided by a first structuring method with a first microstructure (5) for holding lubricant. To be able to now realize the best possible sliding properties for the sliding surface, during the course of a second structuring method, recesses are formed in the at least one sliding surface (4), by which a second microstructure (6) is defined with less depth in comparison with the first microstructure.

8 Claims, 1 Drawing Sheet

METHOD FOR STRUCTURING AT LEAST ONE SLIDING SURFACE OF A MACHINE ELEMENT

INCORPORATION BY REFERENCE

The following documents are incorporated herein by reference as if fully set forth: German Patent Application No.: 102014208419.9, filed May 6, 2014.

BACKGROUND

The invention relates to a method for structuring at least one sliding surface of a machine element, wherein the at least one sliding surface is provided by a first structuring method with a first microstructure for holding lubricant.

DE 102 49 761 A1 discloses a method for structuring a sliding surface of a machine part in the form of a cam follower, wherein, in this method, in the scope of a grinding method, recesses are formed in the sliding surface of the cam follower. The recesses here define a microstructure, in which lubricant can be held for lubricating a contact point of the cam follower with other components of a valve train, for example, a cam.

SUMMARY

Starting from the prior art described above, it is now the object of the present invention to create a method for structuring at least one sliding surface of a machine element, wherein, with the help of this method, the best possible sliding properties can be realized for the sliding surface.

This objective is met through the use of one or more features of the invention. The description which follows and the claims provide advantageous refinements of the invention. A machine element whose sliding surface has been structured with the help of a method according to the invention is also provided.

According to the invention, in a method for structuring at least one sliding surface of a machine element, the at least one sliding surface is provided, by a first structuring method, with a first microstructure that is used to hold the lubricant. In the sense of the invention, by the first structuring method, a microstructure is formed on the at least one sliding surface, by which pockets are formed for holding the lubricant. These pockets then prevent complete drainage of lubricant, so that a certain quantity of lubricant is always held on the at least one sliding surface.

The invention provides the technical teaching that, in the course of a second structuring method, recesses are formed in the at least one sliding surface, by which a second microstructure is defined with less depth in comparison with the first microstructure. Thus, in other words, in a separate structuring method, a second microstructure is formed in the at least one sliding surface, wherein these recesses defining the second microstructure have less depth than the first microstructure.

The method according to the invention here has the advantage that, through the combination of different structuring methods, the two microstructures that are different from each other can be formed without a problem on the sliding surface. Consequently, different properties of the at least one sliding surface can be realized. For example, by constructing the second microstructure with less depth, a surface of the sliding surface can be formed that causes the formation of a dynamically load-bearing lubricant film when the at least one sliding surface of the machine element contacts a sliding surface of the other component, so that the two components sliding on each other are not or essentially no longer in mechanical contact with each other. In this respect, by combining the two microstructures on the sliding surface, on one hand, a complete drainage of the lubricant can be prevented when the system is at standstill and, on the other hand, wear of the contact partners can be counteracted in that these parts are only in connection with one another indirectly via the intermediate lubricant film.

In contrast, in the case of DE 102 49 761 A1, only one microstructure is formed on the sliding surface, which represents, accordingly, only a compromise solution for realizing different properties of the sliding surface. For example, less depth for the microstructure results in optimal formation of a dynamic lubricant film, but creates less storage for the lubricant, when the system is at a standstill.

In the sense of the invention, a time sequence for the two structuring methods can take place arbitrarily with either the first structuring method being performed before the second structuring method or vice versa.

According to one embodiment of the invention, the second structuring method is performed as a laser interference structuring method. Through the use of the laser interference structuring method, microstructures with less depth can be formed, wherein the structures are defined exactly and can be formed periodically one after the other with simultaneously low production times. In the laser interference structuring method, several laser beams are used for the joint formation of each structure. In an especially preferred manner, the second microstructure is here formed with a maximum depth of 1.5 μm, wherein, during operation, this arrangement promotes the formation of a dynamic lubricant film and thus improves the sliding properties.

In one refinement of the invention, the first structuring method is performed as a direct structuring method. Structuring by a laser is also to be understood here as a direct structuring method, in which the individual structures isolated from each other are formed by the effect of a single laser beam. In this way, deeper structures can be realized with high accuracy without a problem, so that sufficiently large pockets are formed for holding lubricant. In particular, the first microstructure has a depth of 40 to 50 μm.

According to another possible construction of the invention, the recesses of the second microstructure are formed pointing toward each other in the shape of an arrow in the sliding direction. Such an orientation of the recesses causes retention of lubricant when the machine element slides with the at least one sliding surface on the respective contact partner and this forms a dynamically load-bearing lubricant film. Here, the recesses can either form paired arrow-like shapes or alternately preferably closed structures that can then have diamond-shaped or trapezoidal designs.

According to another embodiment of the invention, contours that are shaped differently from each other in the second microstructure are defined by the recesses along the at least one sliding surface in the sliding direction. Here, the formation of a dynamic lubricant film can be adapted to different speeds occurring along the sliding surface. For example, in areas with higher expected speeds, a stronger retention of lubricant can be realized, while the lubricant in areas with lower speeds is retained less strongly. Especially for the use of the method according to the invention for machine elements of valve trains, an adaptation to different sliding speeds of a cam on a cam follower or the like can be realized in this way.

As a refinement of the invention, a contact surface of a cam follower of a valve train is processed as the sliding surface. Here, in the scope of the invention, a cam follower can be a lever-type cam follower, such as a rocker arm, rocker lever, etc., or also a bucket tappet, etc. Alternatively, in the scope of the method according to the invention, a running surface of a cam of a valve train could be processed as the sliding surface. In this case, a structuring by the method according to the invention is formed on a running surface of a cam of a camshaft, wherein the running surface can be the surface by which the cam contacts a cam follower or else a surface for contact with a control device, for example, for sliding cam systems, can be used for the axial displacement of a cam on a base camshaft.

The invention is not limited to the specified combination of features of the main claim or the claims dependent on the main claim. There are also options of combining individual features with each other, also those features that emerge from the claims, the following description of a preferred embodiment of the invention, or directly from the drawings. The reference in the claims to the drawings by the use of reference symbols does not limit the scope of protection of the claims.

BRIEF DESCRIPTION OF THE DRAWINGS

A preferred embodiment of the invention is explained in more detail below with reference to the accompanying drawings. Shown therein are.

DETAILED DESCRIPTION OF THE PREFERRED EMBODIMENTS

Figure 1:
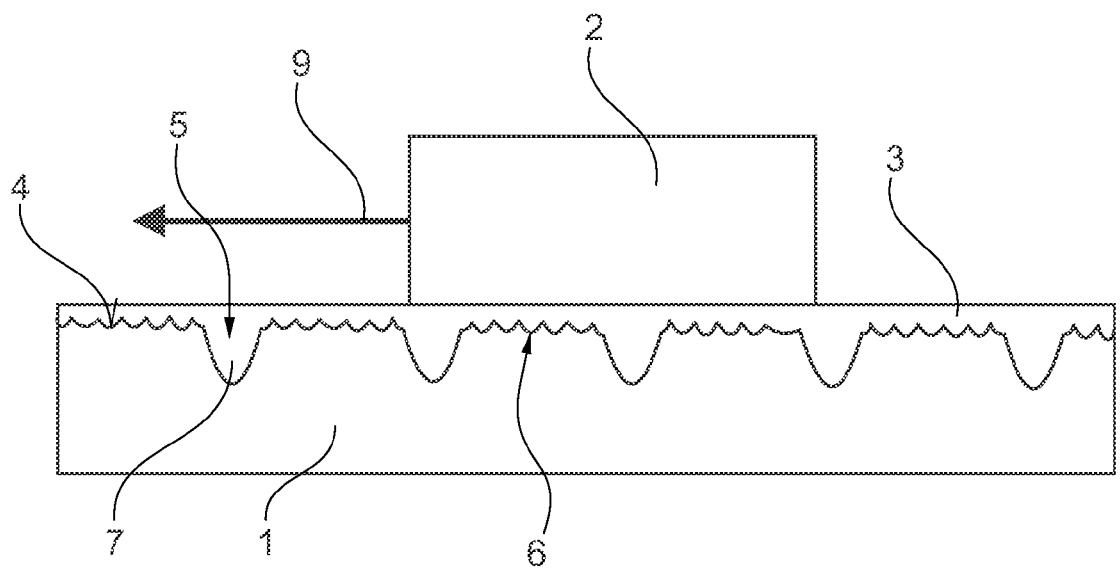
FIG. 1—a schematic representation of a sliding contact of two machine elements, of which one has been processed corresponding to the method according to the invention.

FIG. 1 shows a schematic view of a sliding contact between two machine elements 1 and 2, wherein the machine element 1 is preferably a cam follower, for example, a rocker arm, while the machine element 2 is provided as a cam of a valve camshaft. For lubricating the sliding contact between the machine elements 1 and 2, a lubricant film 3 is formed between these elements, wherein the lubricant is preferably oil.

Figure 2:
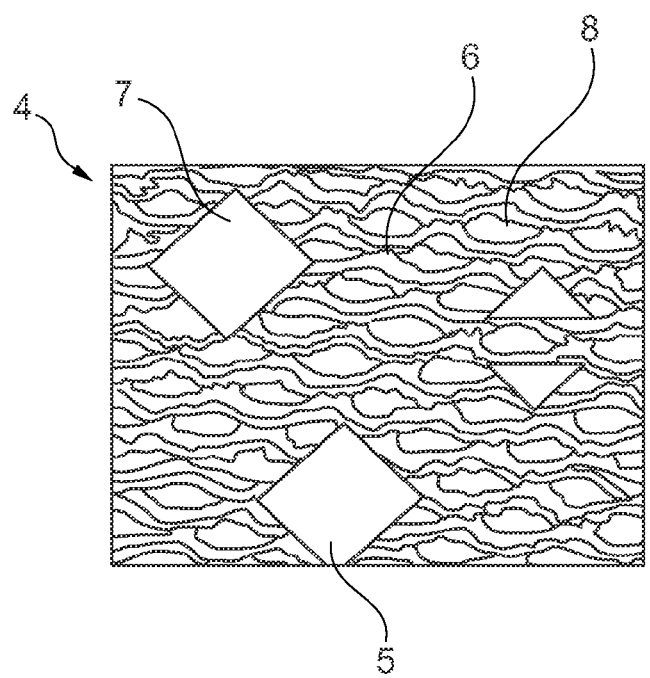
FIG. 2—a top view of the sliding surface of the machine element from FIG. 1 processed according to the invention.

A sliding surface 4 of the machine element 1 has now been processed by a method for structuring according to the invention and provides, accordingly, two microstructures 5 and 6, whose actual design is visible, in particular, from the top view of FIG. 2. As can be seen here, a first microstructure 5 is provided here as diamond-shaped pockets 7, which are used for receiving and holding the lubricant. Here, the pockets 7 of the first microstructure 5 are distributed at regular intervals over the sliding surface 4 of the machine element 1.

In contrast, a second microstructure 6 with less depth than the pockets 7 of the first microstructure 5 is constructed and provided as self-contained, diamond shape-like individual structures 8. These individual structures 8 are here formed uniformly over the entire sliding surface 4 one after the other and ensure a retention of the lubricant when the machine element 2 slides on the machine element 1 due to an orientation of the individual structures 8 in the sliding direction 9. Similar to an aquaplaning effect, this arrangement allows the machine element 2 to float on top of the machine element 1, so that the two machine elements 1 and 2 are not in direct mechanical contact with each other.

In the scope of the method according to the invention, first the second microstructure 6 on the sliding surface 4 of the machine element 1 is constructed by forming the individual structures 8 with the help of a laser interference structuring process. Here, the individual structures 8 are formed by the periodic interaction of several laser beams with each other, wherein a maximum depth of the individual structures 8 is 1.5 µm. Then the pockets 7 of the first microstructure 5 are formed by performing, at the corresponding locations, a direct structuring method by an individual laser beam. Here, the depth of the first microstructure 5 is 40-50 µm.

Thus, by a corresponding method for structuring a sliding surface of a machine element, different microstructures can be formed and thus an optimal adaptation of the sliding properties of this sliding surface to the expected conditions is performed.

LIST OF REFERENCE SYMBOLS

1. Machine element
2. Machine element
3. Lubricant film
4. Sliding surface
5. Microstructure
6. Microstructure
7. Pocket
8. Individual structure
9. Sliding direction

The invention claimed is:

1. A method for structuring at least one sliding surface of a machine element, the method comprising
providing the at least one sliding surface with a first microstructure for holding lubricant using a first structuring method, wherein the first structuring method is performed using a direct structuring method, in which individual structures isolated from each other are formed by a single laser beam, and the individual structures have a depth of 40-50 µm, and
forming further structures in the at least one sliding surface using a second structuring method defining a second microstructure with less depth in comparison with the first microstructure, wherein the second structuring method is performed using a laser interference structuring method with a maximum depth of 1.5 µm of the further structures.

2. The method according to claim 1, wherein the further structures of the second microstructure are formed periodically one after another.

3. The method according to claim 1, wherein the further structures of the second microstructure comprise differently shaped contours in a sliding direction, wherein areas of the machine element with higher expected sliding speeds occurring along the sliding surface are realized with an increased retention of lubricant.

4. The method according to claim 1, wherein a contact surface of a cam follower of a valve train is processed as the sliding surface.

5. The method according to claim 1, wherein a running surface of a cam of a valve train is processed as the sliding surface.

6. A machine element, comprising at least one sliding surface processed according to a method according to claim 1.

7. The machine element according to claim 6, wherein the machine element is a cam follower or cam for a valve train of an internal combustion engine.

8. The method according to claim 1, wherein the individual structures are formed as diamond-shaped pockets when viewed in a direction normal to the sliding surface.

* * * * *